(12) United States Patent
Osmanis et al.

(10) Patent No.: US 10,595,015 B2
(45) Date of Patent: Mar. 17, 2020

(54) METHOD AND SYSTEM FOR DISPLAYING SEQUENCE OF THREE-DIMENSIONAL IMAGES

(71) Applicant: Lightspace Technologies, SIA, Marupe, Marupes novads (LV)

(72) Inventors: Ilmārs Osmanis, Mārupes novads (LV); Krišs Osmanis, Babītes novads (LV); Gatis Valters, Līvāni (LV); Rendijs Smukulis, Riga (LV); Una Kandere, Riga (LV); Roberts Zabels, Riga (LV)

(73) Assignee: LIGHTSPACE TECHNOLOGIES, SIA, Marupe, Marupes Novads (LV)

( * ) Notice: Subject to any disclaimer, the term of this patent is extended or adjusted under 35 U.S.C. 154(b) by 0 days.

(21) Appl. No.: 16/009,650

(22) Filed: Jun. 15, 2018

(65) Prior Publication Data

US 2019/0387220 A1    Dec. 19, 2019

(51) Int. Cl.
*H04N 13/395* (2018.01)
*H04N 13/398* (2018.01)
(Continued)

(52) U.S. Cl.
CPC ......... *H04N 13/395* (2018.05); *G06T 3/4038* (2013.01); *H04N 5/4403* (2013.01);
(Continued)

(58) Field of Classification Search
None
See application file for complete search history.

(56) References Cited

U.S. PATENT DOCUMENTS

| 2002/0113752 A1 | 8/2002 | Sullivan |
| 2006/0056680 A1 | 3/2006 | Stutsman |

(Continued)

FOREIGN PATENT DOCUMENTS

| WO | WO0250777 A2 | 6/2002 |
| WO | 2917055894 A1 | 4/2017 |

OTHER PUBLICATIONS

Osmanis K et al "Advanced multiplanar volumetric 3D display", Proceedings of SPIE [Proceedings of SPIE ISSN 0277-786X vol. 10524], SPIE US vol. 1055, Feb. 8, 2018, pp. 1055510-1055501, XP060101370, DOI: 10.1117/12.2297629; ISBN: 978-1-5106-1533-5.

(Continued)

*Primary Examiner* — Christopher Braniff
(74) *Attorney, Agent, or Firm* — Ziegler IP Law Group, LLC (57) ABSTRACT

Displaying a sequence of three-dimensional images includes generating a data stream including a plurality of image planes associated with each image of the sequence of three-dimensional images, generating a bit-plane stream associated with the data stream, the bit-plane stream including a plurality of bit-planes associated with each image of the sequence of three-dimensional images, buffering the bit-plane stream asynchronously to provide a first plurality of bit-planes associated with a first three-dimensional image, and projecting a first plurality of image planes associated with the first three-dimensional image to display the first three-dimensional image, based upon the first plurality of bit-planes, the first plurality of image planes being projected until a second plurality of bit-planes associated with a second three-dimensional image is provided.

19 Claims, 4 Drawing Sheets

(51) Int. Cl.
*H04N 13/106* (2018.01)
*G06T 3/40* (2006.01)
*H04N 13/183* (2018.01)
*H04N 13/194* (2018.01)
*H04N 9/31* (2006.01)
*H04N 5/44* (2011.01)
*H04N 13/332* (2018.01)
*G06T 15/00* (2011.01)
*G06T 3/20* (2006.01)
*G06T 5/00* (2006.01)
*G06T 7/55* (2017.01)

(52) U.S. Cl.
CPC ........... *H04N 9/312* (2013.01); *H04N 9/3111* (2013.01); *H04N 13/106* (2018.05); *H04N 13/183* (2018.05); *H04N 13/194* (2018.05); *H04N 13/332* (2018.05); *H04N 13/398* (2018.05); *G06T 3/20* (2013.01); *G06T 5/002* (2013.01); *G06T 7/55* (2017.01); *G06T 15/005* (2013.01); *G06T 2210/22* (2013.01)

(56) References Cited

U.S. PATENT DOCUMENTS

2006/0273983 A1 12/2006 Koo
2012/0328192 A1* 12/2012 Fukuhara ............. H04N 19/597
                                                        382/166
2013/0021438 A1* 1/2013 Tucker ................. H04N 13/302
                                                        348/43

OTHER PUBLICATIONS

International Search Report and Written Opinion of the International Searching Authority; PCT/IB2019/054567; Lightspace Technologies, SIA, dated Aug. 7, 2019; 16 pages.

* cited by examiner

METHOD AND SYSTEM FOR DISPLAYING SEQUENCE OF THREE-DIMENSIONAL IMAGES

TECHNICAL FIELD

The present disclosure relates generally to three-dimensional imaging; and more specifically, to methods of displaying sequences of three-dimensional images. Furthermore, the present disclosure also relates to volumetric display systems for displaying the aforesaid sequences of three-dimensional images, such as volumetric display systems comprising multi-plane volumetric displays, volumetric display drivers, graphics processing units and projectors.

BACKGROUND

Over the past few decades, display technologies have witnessed significant technological advancements that allow for realistic two-dimensional imaging, as well as three-dimensional imaging. Generally, two-dimensional displays (such as liquid crystal displays, light-emitting diode based displays, and the like) are employed for three-dimensional imaging, by utilizing binocular disparity. In such a case, different two-dimensional views of a given three-dimensional object/scene are displayed upon (i) separate two-dimensional displays for right and left eyes of a viewer, or (ii) a single two-dimensional display that is shared for both the right and left eyes of the viewer. When such different two-dimensional views are combined in the viewer's brain, the viewer perceives depth of the given three-dimensional object/scene.

However, there exist limitations associated with the use of two-dimensional displays for three-dimensional imaging. Firstly, using binocular disparity for perceiving depth leads to vergence-accommodation conflict. Secondly, such two-dimensional displays are often implemented as near-eye devices (such as heads up display, head, mounted display, virtual reality devices, augmented reality devices, and the like), and prolonged use of such near-eye devices leads to discomfort and eye fatigue for the viewer. Therefore, nowadays, developments are being made to display three-dimensional objects/scenes upon three-dimensional displays.

Presently, autostereoscopic displays are being developed in order to overcome the aforesaid limitations of two-dimensional displays for three-dimensional imaging purposes. Autostereoscopic displays are of various types that include, but are not limited to, multiview-type displays and volumetric-type displays. The multiview-type displays typically recreate multiple views of the given three-dimensional object/scene as observable from different positions by employing, for example, parallax barriers. However, such multiview-type displays suffer from issues such as abrupt changes within views, reduced light intensity and lower imaging resolution.

The volumetric-type displays can employ a projection equipment for projecting light in a three-dimensional volume, active light-emitting voxels, or optically active media, to create a three-dimensional image of the given three-dimensional object/scene. However, there are a number of limitations associated with various volumetric-type displays such as poor image resolution, difficulty in full-colour representation, difficulty in scalability, computationally intensive data processing, difficulty in real-time imaging, requirement of precise balancing of moving parts (such as moving screens), and the like.

Therefore, in light of the foregoing discussion, there exists a need to overcome the aforementioned drawbacks associated with existing display technologies for three-dimensional imaging.

SUMMARY

The present disclosure seeks to provide a method of displaying a sequence of three-dimensional images.

The present disclosure also seeks to provide a volumetric display system for displaying a sequence of three-dimensional images.

The present disclosure seeks to provide a solution to the existing problems associated with display of three-dimensional images, such as poor image resolution, difficulty in full-colour representation, difficulty in real-time imaging, and the like. An aim of the present disclosure is to provide a solution that overcomes at least partially the problems encountered in prior art, and provides high image resolution, full-colour representation, scalability, and real-time imaging.

In one aspect, an embodiment of the present disclosure provides a method of displaying a sequence of three-dimensional images, the method comprising:
(i) generating a data stream comprising a plurality of image planes associated with each image of the sequence of three-dimensional images;
(ii) generating a bit-plane stream associated with the data stream, the bit-plane stream comprising a plurality of bit-planes associated with each image of the sequence of three-dimensional images;
(iii) buffering the bit-plane stream asynchronously to provide a first plurality of bit-planes associated with a first three-dimensional image; and
(iv) projecting a first plurality of image planes associated with the first three-dimensional image to display the first three-dimensional image, based upon the first plurality of bit-planes, the first plurality of image planes being projected until a second plurality of bit-planes associated with a second three-dimensional image is provided.

In another aspect, an embodiment of the present disclosure provides a volumetric display system for displaying a sequence of three-dimensional images, the volumetric display system comprising:
a multi-plane volumetric display comprising a plurality of optical diffusers, wherein at least one plane of the volumetric display is implemented by way of an electrically controllable optical diffuser;
a volumetric display driver coupled to the multi-plane volumetric display, the volumetric display driver being configured to control operation of the multi-plane volumetric display;
a graphics processing unit configured to generate a data stream comprising a plurality of image planes associated with each image of the sequence of three-dimensional images; and
a projector communicably coupled to the graphics processing unit and the volumetric display driver, the projector comprising a light source, a spatial light modulator, a projection arrangement, a logic block, a memory unit and a driver module, the logic block being communicably coupled to the memory unit, and the driver module being coupled to the light source, the spatial light modulator, the projection arrangement, the logic block and the memory unit, wherein:

the logic block is configured to generate a bit-plane stream associated with the data stream, the bit-plane stream comprising a plurality of bit-planes associated with each image of the sequence of three-dimensional images;

the memory unit is configured to buffer the bit-plane stream asynchronously to provide a first plurality of bit-planes associated with a first three-dimensional image to the driver module; and the driver module is configured to control the light source, the spatial light modulator, and the projection arrangement to project a first plurality of image planes associated with the first three-dimensional image for displaying the first three-dimensional image at the multi-plane volumetric display, based upon the first plurality of bit-planes, the first plurality of image planes being projected until a second plurality of bit-planes associated with a second three-dimensional image is provided to the driver module.

Embodiments of the present disclosure substantially eliminate or at least partially address the aforementioned problems in the prior art, and enables displaying of the sequence of three-dimensional images seamlessly, thereby, enhancing an experience of a user viewing such a sequence of three-dimensional images.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method of displaying a sequence of three-dimensional images, the method comprising:
(i) generating a data stream comprising a plurality of image planes associated with each image of the sequence of three-dimensional images;
(ii) generating a bit-plane stream associated with the data stream, the bit-plane stream comprising a plurality of bit-planes associated with each image of the sequence of three-dimensional images;
(iii) buffering the bit-plane stream asynchronously to provide a first plurality of bit-planes associated with a first three-dimensional image; and
(iv) projecting a first plurality of image planes associated with the first three-dimensional image to display the first three-dimensional image, based upon the first plurality of bit-planes, the first plurality of image planes being projected until a second plurality of bit-planes associated with a second three-dimensional image is provided.

In another aspect, an embodiment of the present disclosure provides a volumetric display system for displaying a sequence of three-dimensional images, the volumetric display system comprising:
a multi-plane volumetric display comprising a plurality of optical diffusers, wherein one plane of the volumetric display is implemented by way of one electrically controllable optical diffuser;
a volumetric display driver coupled to the multi-plane volumetric display, the volumetric display driver being configured to control operation of the multi-plane volumetric display;
a graphics processing unit configured to generate a data stream comprising a plurality of image planes associated with each image of the sequence of three-dimensional images; and
a projector communicably coupled to the graphics processing unit and the volumetric display driver, the projector comprising a light source, a spatial light modulator, a projection arrangement, a logic block, a memory unit and a driver module, the logic block being communicably coupled to the memory unit, and the driver module being coupled to the light source, the spatial light modulator, the projection arrangement, the logic block and the memory unit, wherein:
the logic block is configured to generate a bit-plane stream associated with the data stream, the bit-plane stream comprising a plurality of bit-planes associated with each image of the sequence of three-dimensional images;
the memory unit is configured to buffer the bit-plane stream asynchronously to provide a first plurality of bit-planes associated with a first three-dimensional image to the driver module; and the driver module is configured to control the light source, the spatial light modulator, and the projection arrangement to project a first plurality of image planes associated with the first three-dimensional image for displaying the first three-dimensional image at the multi-plane volumetric display, based upon the first plurality of bit-planes, the first plurality of image planes being projected until a second plurality of bit-planes associated with a second three-dimensional image is provided to the driver module.

The present disclosure provides the aforementioned method and the aforementioned volumetric display system for displaying the sequence of three-dimensional images. By term "three-dimensional images" we refer to volumetric three-dimension images i.e. images which make up the three dimensional image on the volumetric display unit. The aforesaid method is fast and computationally simple, thereby, allowing for real or near-real time display of the sequence of three-dimensional images. Furthermore, the aforesaid method allows for accommodating variations in rate of generating the bit-plane stream and rate of displaying the sequence of three-dimensional images. Therefore, different operational rates of different components of the volumetric display system are managed in a manner that the sequence of three-dimensional images is seamlessly displayed to the user. Moreover, the volumetric display system is simple, robust, and user-friendly. Term real time or near-real time refers to displaying images in a way that no apparent delay is observed by user when using the system. As an example, if the system is used for displaying three-dimensional image of an object orientation of which can be controlled by a user interface, the lag between the input and visual feedback should be such that user does not get disturbed. For example, delays of more than 150 msec might not be desirable.

It will be appreciated that the aforesaid method of displaying is not limited to displaying only the sequence of three-dimensional images, but can also be employed for displaying a single image. In such a case, the data stream comprises the single image and the steps (i) to (iv) are implemented for displaying the single image.

At the step (i), a data stream is generated. Notably, the graphics processing unit is configured to generate the data stream. Throughout the present disclosure, the term "graphics processing unit" relates to specialized hardware, software, firmware, or a combination of these, that is configured to process at least one given three-dimensional image to obtain its constituent plurality of image planes. It will be appreciated that the graphics processing unit typically comprises thousands of cores (in practice processing cores etc.) that allow for parallel processing of multiple three-dimensional images. Furthermore, the graphics processing unit is configured to parallelly process the sequence of three-dimensional images at a substantially-high computation rate to generate the plurality of image planes corresponding to each image of the sequence of three-dimensional images. The computational tasks are conveyed for execution on a graphics processing unit by utilizing application programming interfaces (APIs), possibly in various combinations, for example, such as NVIDIA® CUDA™, OpenCL®, DirectX®, OpenGL®.

As mentioned previously, the data stream comprises the plurality of image planes associated with each image of the sequence of three-dimensional images. In other words, the data stream comprises all constituent image planes of all images of the sequence of three-dimensional images. As an example, if the sequence of three-dimensional images comprises 4 images having 5 image planes each, the data stream comprises a total of 20 image planes associated with the 4 images. The data stream can refer to a pixel stream.

It will be appreciated that the sequence of three-dimensional images can relate to a three-dimensional video (such as a three-dimensional virtual game, a three-dimensional tutorial, and the like).

Throughout the present disclosure, the term "image plane" relates to a two-dimensional portion (namely, a slice or a fragment) of a given three-dimensional image. Notably, each image of the sequence of three-dimensional images is a combination of its constituent plurality of image planes. As an example, a given three-dimensional image IMG 1 may depict mountains, a river and a house. In such an example, there may be 3 image planes associated with the given three-dimensional image IMG 1, wherein a first image plane depicts the mountains, a second image plane depicts the river, and a third image plane depicts the house. In such a case, the given three-dimensional image IMG 1 can be understood to be a mosaic (alternatively can be called as stack) (namely, a combination) of the first, second and third image planes.

Optionally, a number of a given plurality of image planes associated with the given three-dimensional image is based upon a number of optical depths that are to be represented within the given three-dimensional image. In such a case, if the given three-dimensional image depicts objects at a predefined number of optical depths, the number of image planes associated with the given three-dimensional image is equal to the predefined number of optical depths.

Optionally, generating the data stream at (i) comprises:
 (a) obtaining the sequence of three-dimensional images;
 (b) pre-processing at least one image of the sequence of three-dimensional images;
 (c) decomposing each image of the sequence of three-dimensional images into a plurality of image planes corresponding thereto;
 (d) post-processing the at least one image of the sequence of three-dimensional images;
 (e) resampling the plurality of image planes corresponding to each image of the sequence of three-dimensional images; and
 (f) storing each image of the sequence of three-dimensional images as a mosaic of its resampled plurality of image planes. Optionally, the graphics processing unit is configured to implement the aforesaid steps (a) to (f).

Optionally, at the step (a), the sequence of three-dimensional images is obtained via a user interface. More optionally, the user interface is configured to provide a plurality of options for selecting different sequences of three-dimensional images. In such a case, a user can select a desired sequence of three-dimensional images from among the plurality of options, via the user interface. In such a case, upon the user's selection, the data associated with the three-dimensional imagery is passed to the graphics processing unit. It will be appreciated that the graphics processing unit is communicably coupled to the memory storage, for implementing the aforesaid operation. Such a memory storage could be a cloud storage, an internal memory of the graphics processing unit, and the like. Optionally, the user interface (graphical) is displayed at the multi-plane volumetric display. In an exemplary implementation, the multi-plane volumetric display may be touch-sensitive, and may therefore allow for the user to select (via touch input) the sequence of three-dimensional images. In another exemplary implementation, the multi-plane volumetric display may be coupled to a user input device (for example, such as a joystick, a keyboard, a handheld controller, and the like), and the user can have control over the operation of the volumetric 3D display system and 3D content displayed thereon. In one embodiment, the multi-plane volumetric display is implemented within a near-eye display apparatus. In another embodiment, the multi-plane volumetric display is implemented as a stand-alone device. Alternatively, optionally, the user interface is displayed (or in other words rendered) an other separate display.

Alternatively, optionally, at the step (a), the sequence of three-dimensional images is generated at the graphics processing unit. Optionally, in such a case, upon generation thereof, the sequence of three-dimensional images is stored in the internal memory of the graphics processing unit, and is obtained therefrom. In deed the term sequence of three-dimensional images can refer to a sequence of "full" three-dimensional images which are displayed one at the time in chronological order (as function of time for example). Additionally, the term can refer to sequence or continuous flow of image depth planes rendered in respective planes.

Optionally, the sequence of three-dimensional images is obtained in form of volumetric type three-dimensional data. Such volumetric type three-dimensional data relates to a data structure which comprises three-dimensional spatial coordinates of a voxel and a colour intensity value associated with the voxel. Throughout the present disclosure, the term "voxel" relates to an element that defines a point in three-dimensional space. Optionally, the three-dimensional spatial coordinates of the voxel are associated with at least one rendering parameter to display information. Examples of the at least one rendering parameter include, but are not limited to, colour of the voxel, and brightness of the voxel. As an example, the volumetric type of three-dimensional data is obtained in form of files that are compliant with a Digital Imaging and Communications in Medicine (DICOM) standard. Notably, such files may be obtained by way of various tomography-type imaging techniques.

Alternatively, optionally, the sequence of three-dimensional images is obtained in form of computer generated three-dimensional data. More optionally, such computer generated three-dimensional data comprises three-dimensional elements (namely, objects) and three-dimensional scenes. Such computer generated three-dimensional data can be described by polygonal surfaces and can be represented by employing application programming interfaces such as OpenGL®. It will be appreciated that the aforesaid volumetric type three-dimensional data and the aforesaid computer generated three-dimensional data are subsequently processed differently from each other.

Optionally, upon obtaining the sequence of three-dimensional images, the sequence of three-dimensional images is loaded into a processing buffer of the graphics processing unit (for example frame by frame or as a single "still" image). Whilst processing, the sequence of three-dimensional images can be accessed with minimal time delay from the processing buffer.

Optionally, the pre-processing of the at least one image of the sequence of three-dimensional images at (b) comprises at least one of:
linearly transforming the at least one image;
cropping the at least one image. Optionally, the graphics processing unit is configured to implement at least one of the aforesaid pre-processing techniques. It will be appreciated that pre-processing of the at least one image of the sequence of three-dimensional images allows for enhancing desired attributes of the at least one image.

Optionally, linearly transforming the at least one image comprises translation of the at least one image and/or rotation of the at least one image. Such linear transformations allow for adjusting alignment (namely, orientation) of the at least one image.

Optionally, whilst cropping the at least one image among the sequence of three-dimensional images, the user selects at least one portion of the at least one image. The cropping of the at least one image by the user allows for reducing size of an original dataset comprising all images present in the sequence of three-dimensional images. Notably, in such a case, upon the aforesaid cropping, a reduced dataset comprises the cropped at least one image and the remaining images of the sequence of three-dimensional images. The reduction of the original dataset reduces processing load carried out by the graphics processing unit. The reduced processing load improves the overall computational efficiency and ensures shorter execution times and consequently improved framerate.

Optionally, whilst decomposing each image of the sequence of three-dimensional images at (c), an entire region of each image of the sequence of three-dimensional images is depicted in its corresponding plurality of image planes. In such a case, entire visual information pertaining to each image within the sequence of three-dimensional images is represented (namely, depicted) in its corresponding plurality of image planes.

Optionally, each image of the sequence of three-dimensional images is decomposed into a predefined number of image planes. In an embodiment, the predefined number of the plurality of image planes generated upon decomposition of a given three-dimensional image, is equal to a number of optical diffusers of the multi-plane volumetric display. In such a case, all optical diffusers are in use, and one image plane is to be projected per optical diffuser. In another embodiment, the predefined number of the plurality of image planes generated upon decomposition of the given three-dimensional image, is lesser than the number of optical diffusers of the multi-plane volumetric display. In such a case, there would exist at least one unused optical diffuser, after all image planes are projected upon the plurality of optical diffusers. As an example, the number of optical diffusers may be 10. In such a case, the given three-dimensional image may be decomposed into 2, 3, 4, 5, 6, 7, 8, 9 or 10 image planes.

Optionally, the decomposition at (c) is implemented by way of parallel processing at the graphics processing unit. Since the graphics processing unit typically comprises thousands of (processing) cores, such cores could be employed for parallel processing. Consequently, a data throughput rate of the graphics processing unit increases.

Optionally, the decomposing at (c) for a given three-dimensional image comprises:
selecting a three-dimensional volume of interest within the given three-dimensional image;
decomposing the three-dimensional volume of interest into a plurality of clipped image planes corresponding to the given three-dimensional image; and
obtaining depth information associated with the plurality of clipped image planes by mapping the plurality of clipped image planes though the given three-dimensional image at discrete positions. Optionally, the graphics processing unit is configured to implement such a decomposition operation. In such a case, only the region of interest of the given three-dimensional image is depicted in its corresponding clipped plurality of image planes. Therefore, only a part of visual information pertaining to the given three-dimensional image is represented (namely, depicted) in its corresponding plurality of image planes. Furthermore, when the given three-dimensional image is decomposed into the plurality of clipped image planes depicting only the three-dimensional volume of interest, a portion of depth information associated with the given three-dimensional image may be lost. Notably, depth information associated with remaining regions (namely, regions other than the region of interest) of the given three-dimensional image may be lost. In such a case, there exists a possibility that depth associated with the region of interest of the given three-dimensional image may be displayed inaccurately. However, via implementing the aforesaid mapping operation, the depth information associated with the plurality of clipped image planes can be precisely obtained with respect to the depth information associated with the given three-dimensional image, thereby, allowing for the region of interest of the given three-dimensional image to be displayed in desired way. It will be appreciated that such a manner of selective image plane decomposition (namely, decomposing only the region of interest) could be employed for at least one image in the sequence of three-dimensional images, whilst a manner of complete image plane decomposition (namely, decomposing entire regions) could be employed for other images in the sequence of three-dimensional images. According to an embodiment the term clipped image plane is referred to a format of image which corresponds to physical architecture of volumetric display. In practice each clipped image plane refers to image which should be displayed on respective optical diffuser of the volumetric display.

Optionally, the post-processing of the at least one image of the sequence of three-dimensional images at (d) comprises at least one of:
  adding graphical representation and/or pointer information to a plurality of image planes corresponding to the at least one image;
  implementing inter-plane antialiasing for the at least one image. Optionally, the graphics processing unit is configured to implement at least one of the aforesaid post-processing techniques. Alternatively, inter-plane antialiasing can be executed as a part of decomposing each image plane. Further post-processing might include such image enhancements as contrast and/or gamma adjustments and similar.

Optionally, the graphical representation information comprises at least one of: user interface (graphical) information, shading information, lighting information, surface information. Optionally, the pointer information comprises at least one of: a position of a given pointer (or plurality of pointers) within the plurality of image planes corresponding to the at least one image, a visual representation of the given pointer, time duration of visibility of the pointer, movement information associated with the given pointer.

Optionally, the inter-plane antialiasing for the at least one image is implemented by way of at least one image processing algorithm. It will be appreciated that implementation of inter-plane antialiasing allows for minimizing visible effects of discrete image planes associated with the at least one image.

Optionally, at the step (e), the resampling of the plurality of image planes corresponding to each image of the sequence of three-dimensional images, is based upon a resolution of the spatial light modulator of the projector. It will be appreciated that such resampling allows for the image planes to be properly displayed on the plurality of optical diffusers of the multi-plane volumetric display. For example if the volumetric data is DICOM (digital imaging and communication on medicine) type volumetric data then resampling might be needed. It is good to note that a computer generated imagery doesn't require typically resampling, as when the vertex based data are rasterized, the resolution is matched to what is required by spatial light modulator.

Moreover, resampling can occur at different steps of the data processing pipeline. It can be executed as described here but within a more reasonable implementation:
  a) Dataset is rotated (but in reality only the viewing angle in respect to the dataset is determined.
  b) The dataset is sampled in the direction previously determined.

During sampling, the algorithm matches the output to the resolution of spatial light modulator. Basically resampling, division into image depth planes and antialiasing is a simultaneous process. Alternatively, the resampling (e) can occur during the step of decomposition.

Optionally, at the step (f), each image of the sequence of three-dimensional images is stored as the mosaic of its resampled plurality of image planes in the internal memory of the graphics processing unit. Therefore, it will be appreciated that the data stream optionally comprises such a stored sequence of three-dimensional images. In an alternative embodiment an order of the steps might be executed in a different order or some of the steps might be executed parallel to each other. For example, resampling (e) could be executed as a part or of pre-processing (b) the at least one image of the sequence of three-dimensional images step. Alternatively, resampling (e) step could be done between steps pre-processing (b) and decomposing (c) steps. Alternatively, step (b) could be done as part of decomposition into image planes step (c).

Optionally, the method further comprises receiving the generated data stream at the projector. Optionally, in such a case, a display interface module of the graphics processing unit is configured to transmit the generated data stream therefrom and a transceiver module of the projector is configured to receive the transmitted data stream. Notably, the projector is communicably coupled to the graphics processing unit.

Throughout the present disclosure the term "projector" relates to specialized equipment for projecting a given plurality of image planes associated with a given three-dimensional image to display the given three-dimensional image, based upon a given plurality of bit-planes associated with the given three-dimensional image.

Optionally, the display interface module of the graphics processing unit is communicably coupled to the transceiver module of the projector by way of at least one communication link. Notably, the at least one communication link between the display interface module of the graphics processing unit and the transceiver module of the projector can be a wired communication link, a wireless communication link, or any combination thereof. It will be appreciated that the at least one communication link allows for a high data throughput between the graphics processing unit and the projector, thereby, ensuring seamless and quick transmission of data therebetween. Furthermore, it will be appreciated that a greater number of communication links between the graphics processing unit and the projector allows for achieving a greater rate of data transmission therebetween. Optionally, the at least one communication link is established between compatible communication interfaces of the graphics processing unit and the projector. Examples of the at least one communication link include, but are not limited to, a DisplayPort communication link, a universal serial bus communication link, a Bluetooth® communication link, a Thunderbolt® communication link a High Definition Multimedia Interface (HDMI/HDMI 2.1).

Optionally, the method further comprises processing the data stream in accordance with a predefined data communication standard. The term "predefined data communication standard" relates to an established guideline for communication between two entities. Therefore, the data stream is formatted in accordance with the predefined data communication standard that is associated with the at least one communication link between the display interface module of graphics processing unit and transceiver module of the projector. Optionally, a logic circuitry associated with the transceiver module of the projector is configured to process the data stream in the aforesaid manner.

At the step (ii), the bit-plane stream associated with the data stream is generated. The bit-plane stream comprises the plurality of bit-planes associated with each image of the sequence of three-dimensional images. The logic block is configured to generate the bit-plane stream associated with the data stream. Notably, for a given plurality of bit-planes that are associated with a given three-dimensional image, each bit-plane comprises information about a given bit of a colour of all pixels in the given image depth plane. Therefore, throughout the present disclosure, the term "bit-plane" relates to information about a respective bit of a colour of all the pixels in the given image depth plane. In operation, the logic block deconstructs such colour information of all the pixels of the given three-dimensional image. The logic block comprises logic circuitry that allows for generating the bit-plane stream associated with the data stream.

Optionally, a predefined number of bit planes is associated with each image of the sequence of three-dimensional images. In an embodiment, 24 bit planes are associated with each image depth plane of the sequence of three-dimensional images. As an example for a 3D (three-dimensional) image 24×N bit planes are associated where N is the number of layers. Notably, since humans are trichromats, each image of the sequence of three-dimensional images might be required to be trichromacy-compliant. Therefore, truecolor may be employed for representing colour information of each image of the sequence of three-dimensional images. In such a case, 8 bit-planes are associated with each of: a green colour channel, a red colour channel, and a blue colour channel, for obtaining accurate 24 bit truecolor information pertaining to each image of the sequence of three-dimensional images. In another embodiment, 8 (12 or 14 etc) bit planes are associated with each the image depth plane of the sequence of three-dimensional images. Notably, such a number of bit-planes allows for accurately depicting grayscale colour information associated with each image of the sequence of three-dimensional images.

At the step (iii), the bit-plane stream is buffered asynchronously to provide the first plurality of bit-planes associated with the first three-dimensional image. Notably, the memory unit of the projector is configured to buffer the bit-plane stream asynchronously. It will be appreciated that the bit-plane stream is buffered asynchronously in time for providing the plurality of bit-planes associated with each image of the sequence of three-dimensional images in a sequential manner. Such asynchronous buffering allows for accommodating variations in rate of which data (the bit-plane stream or other data stream) is received by projector and rate of displaying the sequence of three-dimensional images at the multi-plane volumetric display. It will be appreciated that the memory unit of the projector could be implemented by way of hardware, software, firmware, or a combination of these, that is/are configured to implementing the aforesaid buffering operation.

Optionally the buffering the bit-plane stream asynchronously at (iii) comprises:
  receiving the bit-plane stream, at a first data exchange rate;
  storing the received bit-plane stream, at a dedicated memory buffer
  extracting upon request the stored bit-plane stream from the dedicated buffer;
  transmitting the extracted bit-plane stream at a third data exchange rate,
  wherein the sum of the first data exchange rate and the third data exchange rate doesn't exceed the second data exchange rate.

Indeed according to the optional embodiment the first data exchange rate is the rate at which a bit-plane stream is generated. Typically, the rate correlates directly with data transmission rate from graphical processing unit (GPU) to volumetric display unit. The received bit-plane stream is stored at a dedicated memory buffer. The dedicated memory buffer can be internal or external memory for example. Controlling logic of the device is configured to request the stored bit plane stream from the dedicated memory buffer. The extracted bit-plane stream is transmitted further using a third data exchange rate. The third data rate can be considered to be an average data rate at which spatial light modulator requests data. The dedicated memory buffer is arranged to be able to transfer data with a second data exchange rate. The second data exchange rate corresponds to the maximum data exchange rate which can be used with the dedicated memory buffer. Thus, the second exchange rate can be considered to be a general data read/write speed at which the external memory, which typically is a random access memory (RAM) can operate. In general RAM needs to be sufficiently fast to be able to read and write data at a rate which is higher than the sum of data generation rate and data request rate. In deed data is transmitted from and to RAM at the second data exchange rate and data is forwarded to spatial light modulator at the third data exchange rate.

Optionally the memory unit further comprises at least one input data buffer, at least one output data buffer, an external memory module and a memory controller module, wherein whilst buffering the bit-plane stream asynchronously, the memory controller module is configured to:
  monitor a first fill state of the at least one input data buffer, which the at least one input data buffer is configured to receive the bit-plane stream from the logic block at a first data exchange rate;
  monitor a second fill state of the at least one output data buffer, which the at least one output data buffer is configured to transmit the bit-plane stream to the driver module, at a third data exchange rate;
  use the first fill state to control the external memory module to store the received bit-plane stream;
  use the second fill state to control the external memory module to extract the stored bit-plane stream and transmit the extracted bit-plane stream to the at least one output data buffer;

wherein the sum of the first data exchange rate and the third data exchange rate is less than a second data exchange rate.

According to embodiment the second data exchange rate corresponds to the maximum data exchange rate specifications of the external memory module. Alternatively, the first data exchange rate and the third data exchange rate is less than 85% of a second data exchange rate. If the sum is higher it might lead to problems with the system's ability to display a sequence of three-dimensional images. Further alternatively the above limit can be set to 95%.

Optionally, in operation, the bit-plane stream which is generated at the logic block, is received by at the at least one input data buffer at the first data exchange rate. Optionally, in such a case, the at least one input data buffer is implemented by way of at least one First In First Out (FIFO) buffer. It will be appreciated that the bit-plane stream is stored in an ordered (namely, systematic) manner at the at least one input data buffer, thereby, allowing for achieving low latency during memory read and write operations associated with at least one input data buffer. Notably, the memory write operation associated with the at least one input data buffer relates to storing the bit-plane stream within the at least one input data buffer, at the first data exchange rate. Further the first fill state of the input data buffer is monitored. The first fill state corresponds to how large portion of the input date buffer is filled (10%, 30%, 50%, 80%, 100%). Likewise, a second fill state of output data buffer is monitored. The output data buffer is configured to transmit the bit plane data to the driver module at a third data rate. The second fill rate state can be for example 10%, 30%, 50%, 80%, 100%. The first fill state value is used by the external memory module to issue a data transfer from the input data buffer to the external memory module (RAM) or otherwise to start storing the data. As an example, if the first fill state is exceeding predetermined level of say 35% the data in accordance to the operational principles of FIFO buffer are transferred for storing at the external memory thus emptying the input data buffer. Further the second fill state value is used to control the external memory module. If the second fill state value is below a predetermined threshold value say 10%, 30%, 50%, 80% then stored bit-plane stream is extracted from the external memory and provided to the output buffer. Further the sum of the first exchange rate and the third exchange rate should be preferably less than 85% of a second exchange rate to ensure fluent operation. The second exchange rate corresponds to the maximum data exchange rate specifications of the external memory module. Furthermore, the memory read operation associated with the at least one input data buffer relates to accessing the stored bit-plane stream from the at least one input data buffer at the second data exchange rate. Thereafter, in operation, the bit-plane stream which is stored (in practical implementation a small portions/snippets are stored in the buffer at a time) at the at least one input data buffer, is transmitted to the external memory module for storage thereat. Optionally, the bit-plane stream is stored at the external memory module only when the bit-plane stream is not required by the projector. Optionally, the external memory module is a volatile random access memory (for example, such as DDR3-type memory or DDR4-type memory). Optionally, at the external memory module, the bit-plane stream is at constant addresses whilst maintaining an ordered data structure. In deed it is good to understand that there might be alternative ways to manage data within the memory. The ordered data structure enhances efficiency of memory read and write operations associated with the external memory.

Notably, a memory write (and read) operation associated with the external memory module relates to storing (and extracting) the bit-plane stream within the the external memory module, at the second data exchange rate. Thereafter, in operation, the bit-plane stream is transmitted by the external memory module to the driver module, via the at least one output data buffer. A memory write operation associated with the at least one output data buffer relates to receiving the bit-plane stream at the at least one output data buffer, at the third data exchange rate. Furthermore, a memory read operation associated with the at least output data buffer relates to accessing of the stored bit-plane stream from the at least output data buffer by the driver module, at the third data exchange rate. Therefore, it will be appreciated that the memory controller module is implemented by way of hardware, software, firmware, or a combination of these, configured to control operation of and provide an interface between the at least one input data buffer, the external memory module, and the at least one data output buffer. Typically, when the memory controller module is not transmitting the bit-plane stream from the at least one input data buffer to the external memory module, the memory controller module transmits the stored bit-plane stream from the external memory module to the at least one output data buffer. Optionally, the at least one output data buffer is implemented by way of at least one First In First Out (FIFO) buffer. It will be appreciated that the first, second and third data exchange rates are substantially high, thereby allowing for fast data transmission between the at least one input data buffer, the external memory module, and the at least one data output buffer. Alternatively depending on architecture the external memory module might be implemented as an internal memory module of the processing device.

Optionally, the memory controller module prioritises the memory read operation associated with the at least one output data buffer over other aforesaid memory read and write operations, to ensure uninterrupted projection of the sequence of three-dimensional images via the projector. In practice one of the tasks of the memory controller module is not letting the input FIFO buffer to overflow. Thus, this "bucket" needs to be monitored and emptied, so that no data is "spilled" and thus lost and to check whether there is information for the projector. I.e one task of the memory controller module is to ensure that the outgoing FIFO buffer doesn't become completely empty and constantly supply it with data to be displayed by the spatial light modulator.

Optionally, the second data exchange rate is greater than a sum of the first data exchange rate and the third data exchange rate.

Optionally, the aforesaid asynchronous buffering operation could be implemented by way of at least one of: an application-specific integrated circuit (ASIC), a field-programmable gate array (FPGA).

At the step (iv), the first plurality of image planes associated with the first three-dimensional image is projected to display the first three-dimensional image, based on the first plurality of bit-planes. The first plurality of image planes are projected until the second plurality of bit-planes associated with a second three-dimensional image is provided. Notably, the driver module is configured to control the light source, the spatial light modulator and the projection arrangement to project the first plurality of image planes associated with the first three-dimensional image for displaying the first three-dimensional image at the multi-plane volumetric display, based upon the first plurality of bit-planes. Notably, a given plurality of image planes associated with a given three-dimensional image are projected via the projector, based upon a given plurality of bit-planes associated with the given three-dimensional image, until a subsequent plurality of bit-planes associated with a subsequent three-dimensional image to be displayed after the given three-dimensional image, are received via the aforesaid asynchronous buffering. It will be appreciated that such a manner of asynchronous buffering and consequent displaying of the sequence of three-dimensional images allows for efficiently managing different operational rates of different components (such as, the graphics processing unit, display port, the projector, the volumetric display driver and the multi-plane volumetric display) in a manner that the sequence of three-dimensional images is seamlessly displayed to the user. Furthermore, the first plurality of image planes are projected onto a definite three-dimensional volume constituted by an arrangement of the plurality of optical diffusers of the multi-plane volumetric display.

The driver module is implemented by way of hardware, software, firmware, or a combination of these, that is configured to control operation of the light source, the spatial light modulator, the projection arrangement, the logic block and the memory unit. The driver module can further be understood as computer unit in general operating the display system.

Throughout the present disclosure, the term "light source" relates to equipment that is configured to emit a light beam therefrom. It will be appreciated that in operation, the light source is configured to emit the light beam of visible wavelength (namely, light of a wavelength that is visible to humans). Optionally, the light source is implemented by way of at least one of: a visible Light-Emitting Diode (LED), a visible light laser, a high intensity gas-discharge type bulb having colour filters associated therewith. More optionally, the light source is a high-power light source.

Optionally, the driver module is configured to control an intensity of the light beam that is emitted from the light source.

Optionally, the light source is implemented by way of a plurality of light-emitting diodes configured to emit light within at least three wavelength ranges, wherein at least one first light emitting diode is configured to emit light having a first wavelength, at least one second light emitting diode is configured to emit light having a second wavelength and at least one third light emitting diode is configured to emit light having a third wavelength.

Optionally, the second wavelength is greater than the first wavelength, but lesser than the third wavelength. As an example, the first wavelength may correspond to a blue colour light (namely, a wavelength lying between 440 nanometres to 470 nanometres), the second wavelength may correspond to a green colour light (namely, a wavelength lying between 520 nanometres to 550 nanometres), and the third wavelength may correspond to a red colour light (namely, a wavelength lying between 610 nanometres to 650 nanometres). Alternatively, optionally, the second wavelength is greater than the third wavelength, but lesser than the first wavelength. As an example, the first wavelength may correspond to a red colour light (namely, a wavelength lying between 610 nanometres to 650 nanometres), the second wavelength may correspond to a green colour light (namely, a wavelength lying between 520 nanometres to 550 nanometres), and the third wavelength may correspond to a blue colour light (namely, a wavelength lying between 440 nanometres to 470 nanometres).

Optionally, at the light source, at least one first light emitting diode, the at least one second light emitting diode, and the at least one third light emitting diode are arranged in an increasing (i.e. in respect to display spatial light modulator) order of wavelength of light that is to be emitted therefrom. Alternatively, optionally, at the light source, at least one first light emitting diode, the at least one second light emitting diode, and the at least one third light emitting diode are arranged in a decreasing (i.e. in respect to spatial light modulator) order of wavelength of light that is to be emitted therefrom. Further alternatively, if a three spatial light modulator setup is used for the projection, each color is reproduced by an individual spatial light modulator. In said example order can be selected freely.

In operation, the spatial light modulator (or modulators in case of red, green and blue) is configured to spatially modulate the light beam emitted from the light source. Notably, the spatial light modulator is arranged on an optical path of the emitted light beam. Optionally, the spatial light modulator is configured to modulate amplitude and/or phase of the emitted light beam in at least one dimension. Optionally, the spatial light modulator is implemented by way of at least one of: a digital micromirror device, a liquid-crystal based spatial light modulator (Such as ferroelectric liquid crystals on silicon (FLCoS) by "Fourth Dimension Displays"). Typically, the digital micromirror device is an electro-optical micromechanical system, which in essence is an array of electrically controllable array of microscopic mirrors with a single mirror representing a pixel. Therefore, by varying position of the array of microscopic mirrors, light can be directed towards the projection arrangement (bright pixel or pixel-on) or diverted away from the projection arrangement (dark pixel or pixel-off). Optionally, an angular range for variation of the position of the array of microscopic mirrors (via movement of the array of microscopic mirrors) is for example +/−12 degrees from a default position thereof.

Optionally, when the spatial light modulator is implemented by way of the liquid-crystal based spatial light modulator, the projector further comprises at least one polarizer configured to provide polarized light to the spatial light modulator.

In operation, the projection arrangement is configured to guide modulated light from the spatial light modulator, and direct such light towards the multi-plane volumetric display. Optionally, the projection arrangement comprises at least one optical element. More optionally, the at least one optical element is implemented by way of at least one of: a mirror, a lens, a prism, a waveguide. It will be appreciated that the projection arrangement allows for focusing a given plurality of image planes associated with a given three-dimensional image upon the plurality of optical diffusers with an acceptable level of sharpness.

In operation, the plurality of optical diffusers are configured to receive thereupon, projections of the first plurality of image planes associated with the first three-dimensional image. Notably, one optical diffuser is configured to receive a projection of one image plane thereupon. It will be appreciated that the plurality of optical diffusers are configured to receive thereupon projections of all image planes associated with all images of the sequence of three-dimensional images.

Optionally, a number of the plurality of optical diffusers ranges from 2 to 50. For example, the number of optical diffusers can be 2, 3, 4, 5, 10, 15, 20, 25, 30, 35, 40, 45 or 50. Optionally, the number of the plurality of optical diffusers is greater than 50. For example, the number of optical diffusers can be 50, 55, 60, 65, 70, 75, 80, 85, 90, 95, 100, 120, 140, 160, 180 or 200.

It will be appreciated that the plurality of optical diffusers can have equal or unequal spacing therebetween. The number of optical diffusers and the spacing therebetween define volume and/or depth resolution of the sequence of three-dimensional images.

As mentioned previously, the volumetric display driver is configured to control operation of the multi-plane volumetric display. The volumetric display driver is implemented by way of hardware, software, firmware, or a combination of these, configured to control operation of the plurality of optical diffusers of the multi-plane volumetric display. The volumetric display driver is communicably coupled to the projector, and specifically, to the driver module of the projector. It will be appreciated that the aforesaid communicable coupling between the driver module and the volumetric display driver allows for synchronous operation of the projector and the multi-plane volumetric display, respectively. As a result, the user's experience of viewing the displayed sequence of three-dimensional images is enhanced.

Optionally, when projecting a given plurality of image planes upon the plurality of optical diffusers, a first image plane among the given plurality of image planes is displayed upon an optical diffuser that is nearest to the user. In such a case, subsequent image planes of the plurality of image planes are displayed on subsequent optical diffusers in the same order (namely, from nearest optical diffuser to farthest optical diffuser from the user). Alternatively, optionally, the image planes among the plurality of image planes are displayed from the farthest optical diffuser to the nearest optical diffuser from the user. Alternatively, image planes can be displayed in an interlaced regime.

Optionally, each of the plurality of optical diffusers is implemented by way of a liquid crystal cell. Optionally, a given liquid crystal cell is electrically switchable between a substantially transparent state and a substantially diffuse state. As an example, the substantially transparent state may range from 60% transparency to 100% transparency (for example, such as 60%, 65%, 70%, 75%, 80%, 85%, 90%, 95% or 100% transparency) whereas the substantially diffuse state may range from 60% diffuse to 100% diffuse (for example, such as 60%, 65%, 70%, 75%, 80%, 85%, 90%, 95% or 100% diffuse).

Optionally, in operation, when a given image plane is to be projected upon a given optical diffuser, the volumetric display driver is configured to electrically switch the given optical diffuser to the substantially diffusive state whilst electrically switching all other optical diffusers among the plurality of optical diffusers to the substantially transparent state. Therefore, the volumetric display driver is configured to electrically switch one optical diffuser among the plurality of optical diffusers, at a given time. It will be appreciated that the volumetric display driver is configured to implement the foresaid procedure for all subsequent image planes that are to be projected upon other optical diffusers. Further also interlacing can be used to display image depth planes.

Optionally, the sequence of three-dimensional images is displayed in real or near-real time. Optionally, the volumetric display driver is configured to control the plurality of optical diffusers for displaying the sequence of three-dimensional images at the multi-plane volumetric display in real or near-real time. It will be appreciated that the projector and the volumetric display driver operate synchronously, to allow for the aforesaid real or near-real time display of the sequence of three-dimensional images. Notably, such real or near-real time operation enhances the viewing experience of the user by projecting the plurality of image planes pertaining to each three-dimensional image in a manner that the user recognises the plurality of image planes as a single three-dimensional image. Moreover, the real or near-real time operation also allows for displaying the sequence of three dimensional images in a manner that the user appears to be viewing a three-dimensional video.

Optionally, a refresh rate of the multi-plane volumetric display lies within 20 Hz to 75 Hz. Throughout the present disclosure, the term "refresh rate" relates to a rate at which a given plurality of image planes pertaining to a single three-dimensional image are displayed repeatedly on the plurality of optical diffusers of the multi-plane volumetric display. In other words, when the given plurality of image planes pertaining to the single three-dimensional image are displayed once at the multi-plane volumetric display, the multi-plane volumetric display is said to have displayed one volume of the single three-dimensional image. Therefore, the refresh rate of the multi-plane volumetric display relates to a number of volumes that the multi-plane volumetric display can display in a second. It will be appreciated that a high refresh rate facilitates a flicker-less image viewing experience for the user. As an example, if a given refresh rate of the multi-plane volumetric display is 30 Hz, the multi-plane volumetric display can display 30 volumes of a given three-dimensional image in one second.

Optionally, the refresh rate of the multi-plane volumetric display ranges from 40 Hz to 60 Hz. More optionally, the refresh rate of the multi-plane volumetric display is 50 Hz.

Typically, the refresh rate of the multi-plane volumetric display remains constant, but the first data exchange rate may vary in accordance with operational speed of the graphics processing unit, communication latency between the graphics processing unit and the projector. It will be appreciated that asynchronous buffering allows for managing the aforesaid differences. As an example, when the first data exchange rate is lower than the refresh rate of the multi-plane volumetric display, the volumetric display driver is configured to display a single volume of image planes corresponding to a given three-dimensional image multiple times, in a manner that the user is unable to recognize flicker and time lag.

Optionally, the volumetric display system further comprises a power source, the power source being configured to provide electrical power to at least the driver unit of the projector and the volumetric display driver. Optionally, the power source is further configured to provide electrical power to the graphics processing unit. In an example, the power source may provide 12 volts electrical supply to the driver unit of the projector and may provide 200 volts electrical supply to the volumetric display driver.

Optionally, the method further comprises
(v) obtaining feedback from the user, wherein the feedback pertains to the displayed sequence of three-dimensional images; and
(vi) implementing an action in real or near-real time, based upon the obtained feedback. It will be appreciated that the feedback from the user allows for the volumetric display system to enhance the image viewing experience of the user as it allows for the user to control (namely, adjust) the displayed sequence of three-dimensional images according to his/her needs and interests. The user may have positive or negative feedback related to viewing experience, pertaining to the displayed sequence of three-dimensional images. Furthermore, the user could manipulate at least one image of the displayed sequence of three-dimensional images. In one example, the feedback from user is obtained from the multi-plane volumetric display via the user interface rendered in the multi-plane volumetric display. In such an example, the user may rotate an object depicted in the displayed sequence of three-dimensional images. In another example, the feedback from user is obtained from the user input device coupled to at least one of: the projector, the multi-plane volumetric display or to a computer.

Optionally or additionally the method comprises buffering the generated data stream (i) asynchronously prior generating a bit plane stream (ii). This gives more flexibility on which exchange rate of the data stream can be provided. This might also enable a simpler design since generating a bit-plane stream from the data stream takes variable time depending on the complexity of the three-dimensional image. Buffering can also be used to enable different refresh rates. In an alternative embodiment order of steps (i), (ii), (iii), (iv), (v) and (vi) might be altered.

In an alternative or additional embodiment a method of displaying a sequence of three-dimensional images comprises:
(A) generating a data stream comprising a plurality of image planes associated with each image of the sequence of three-dimensional images;
(B) buffering the data stream asynchronously to provide a first plurality of image depth-planes associated with a first three-dimensional image;
(C) generating a bit-plane stream associated with the first plurality of image depth-planes, the bit-plane stream comprising a plurality of bit-planes associated with each image of the sequence of three-dimensional images;
(D) projecting a first plurality of image planes associated with the first three-dimensional image to display the first three-dimensional image, based upon the first plurality of bit-planes, the first plurality of image planes being projected until a second plurality of bit-planes associated with a second three-dimensional image is provided.

Optionally, the action to be implemented, based upon the obtained feedback is one of: stopping the display of the sequence of three dimensional images, adjusting the sequence of three dimensional images in accordance with user's manipulation, displaying another sequence of three dimensional images.

Optionally, the sequence of three-dimensional images is displayed at a near-eye display apparatus. Optionally, in this regard, at least the projector, the volumetric display driver and the multi-plane volumetric display of the volumetric display system are implemented within the near-eye display apparatus. It will be appreciated that the near-eye display apparatus could be used for displaying simulated environments to the user. Therefore, when the near-eye display apparatus is used for displaying the sequence of three-dimensional images, the user's experience of the simulated environment is substantially enhanced. In such a case, an eye strain generally felt by the user is substantially reduced, since the sequence of three-dimensional images actually depicts physical depth thereof. Optionally, the simulated environment is one of: a virtual reality environment, a mixed reality environment, an augmented reality environment. In such a case, the sequence of three-dimensional images could relate to a three-dimensional entertainment video, a three-dimensional simulated reality game, a three-dimensional instructional video, and the like.

DETAILED DESCRIPTION OF THE DRAWINGS

Figure 1:
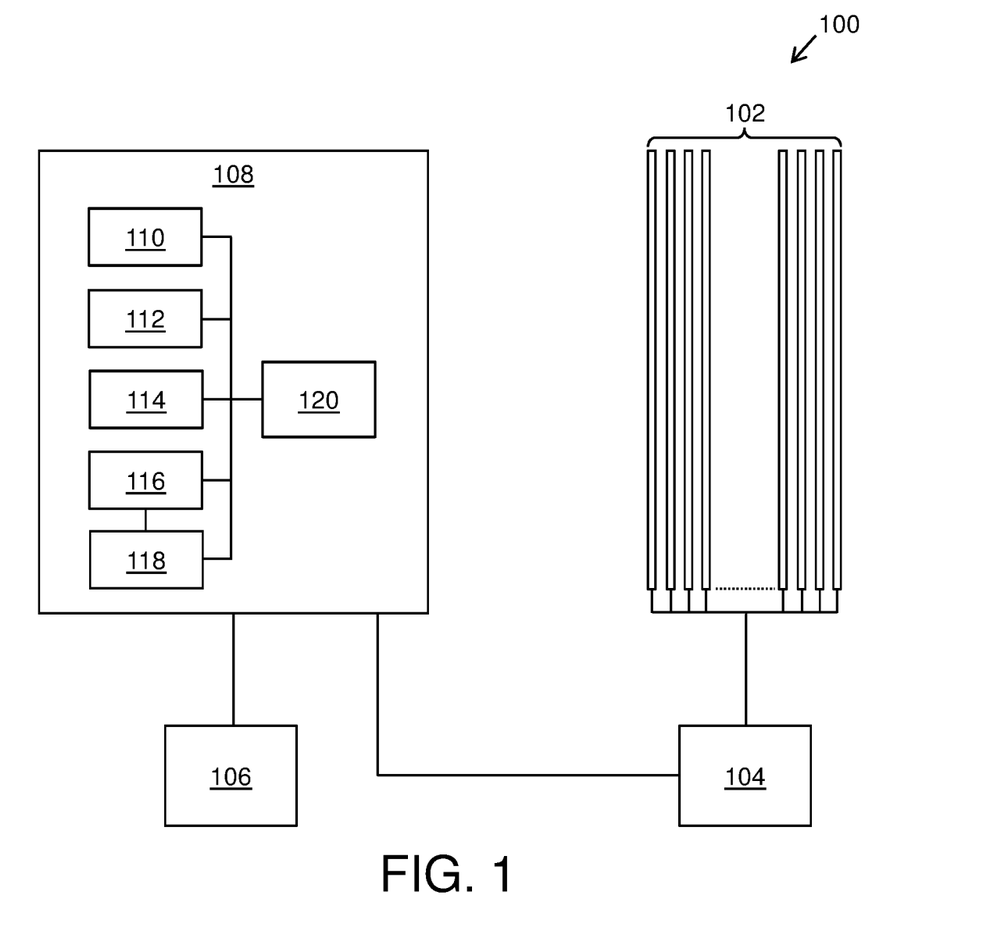
FIG. 1 is a schematic illustration of a volumetric display system for displaying a sequence of three-dimensional images, in accordance with an embodiment of the present disclosure.

Referring to FIG. 1, illustrated is a schematic illustration of a volumetric display system 100 for displaying a sequence of three-dimensional images, in accordance with an embodiment of the present disclosure. The volumetric display system 100 comprises a multi-plane volumetric display 102; a volumetric display driver 104; a graphics processing unit 106; and a projector 108 communicably coupled to the graphics processing unit 106 and the volumetric display driver 104.

As shown, the multi-plane volumetric display 102 comprises a plurality of optical diffusers, wherein one plane of the volumetric display is implemented by way of one optical diffuser. The volumetric display driver 104 is coupled to the multi-plane volumetric display 102. Furthermore, the volumetric display driver 104 is configured to control operation of the multi-plane volumetric display 102. The graphics processing unit 106 is configured to generate a data stream comprising a plurality of image planes associated with each image of the sequence of three-dimensional images. The projector 108 comprises a light source 110, a spatial light modulator 112, a projection arrangement 114, a logic block 116, a memory unit 118 and a driver module 120. The logic block 116 is communicably coupled to the memory unit 118. Furthermore, as shown, the driver module 120 is coupled to the light source 110, the spatial light modulator 112, the projection arrangement 114, the logic block 116 and the memory unit 118. In operation, the logic block 116 is configured to generate a bit-plane stream associated with the data stream, the bit-plane stream comprising a plurality of bit-planes associated with each image of the sequence of three-dimensional images. The memory unit 118 is configured to buffer the bit-plane stream asynchronously to provide a first plurality of bit-planes associated with a first three-dimensional image to the driver module 120. The driver module 120 is configured to control the light source 110, the spatial light modulator 112, and the projection arrangement 114 to project a first plurality of image planes associated with the first three-dimensional image for displaying the first three-dimensional image at the multi-plane volumetric display 102, based upon the first plurality of bit-planes, the first plurality of image planes being projected until a second plurality of bit-planes associated with a second three-dimensional image is provided to the driver module 120.

Figure 2:
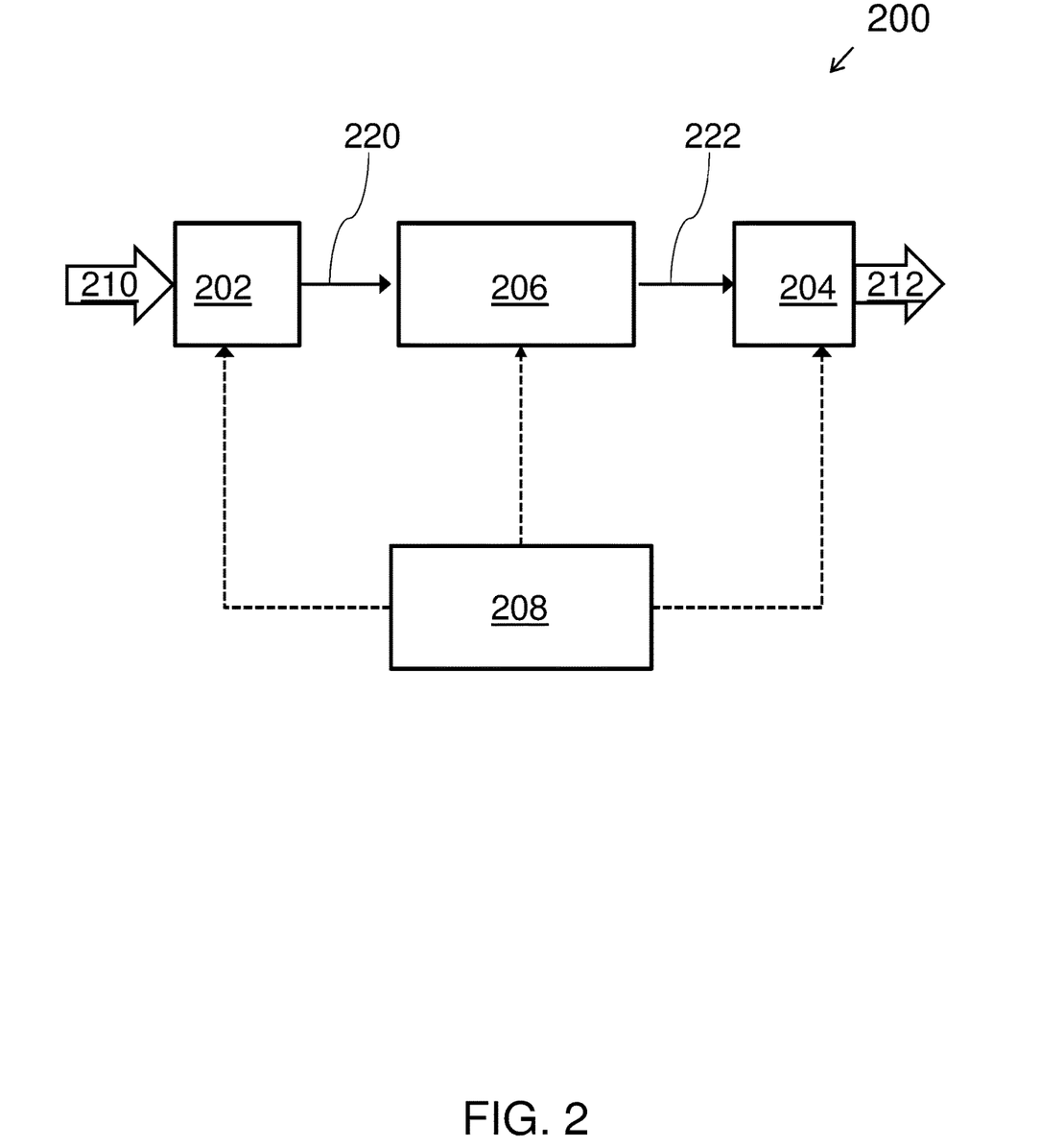
FIG. 2 illustrates a block diagram of architecture of a memory unit of a volumetric display system, in accordance with an embodiment of the present disclosure.

Referring to FIG. 2, illustrated is a block diagram of architecture of a memory unit 200 of a volumetric display system (for example such as, the volumetric display system 100 of FIG. 1), in accordance with an embodiment of the present disclosure. The memory unit 200 comprises at least one input data buffer, depicted as an input buffer 202, at least one output data buffer, depicted as an output buffer 204, an external memory module 206 and a memory controller module 208. In operation, whilst buffering the bit-plane stream asynchronously, the memory controller module 208 is configured to monitor the first fill state of the at least one input buffer 202 (a parameter characterizing a fullness of the at least one input buffer 202) and transfer the data from the at least one input data buffer 202 for storing at the external memory module 206 if the first fill state of the at least one said input buffer 202 is above a predetermined threshold. The bit plane data stream 210 is incoming at the at least one input data buffer 202 at the first data exchange rate. The memory controller module 208 is further configured to monitor the second fill state of the at least one output buffer 204 and control the external memory module 206 to extract and transfer the stored at the external memory module 206 bit-plane stream to the at least one output buffer 204, if the second fill state falls below a predetermined threshold. The at least one output buffer 204 is constantly emptied at a third data exchange rate by transferring bit-plane data stream 212 to a driver module (not shown). The said utilization of fast input and output buffers 202 and 204 in conjunction with larger capacity external memory module 206 can be described as time asynchronous buffering which allows for the outgoing data flow 212 to be on average constant in time thus ensuring constant refresh rate of the display device. At the same time such time asynchronous buffering approach allows for variations in the incoming data flow 210 which might occur due to fluctuations in the framerate of 3D content generation. For a smooth uninterrupted operation, the external memory module (typically, a volatile random access memory) 206 should support sufficient data transfer speeds 220 and 222 between itself and the respective input and output buffers 202 and 204. As the maximum data transfer rate that is supported by the external memory module 206 corresponds to the second data exchange rate, it should be higher for example by at least 10% margin than the conjugate of the first and third data exchange rates.

Figure 3:
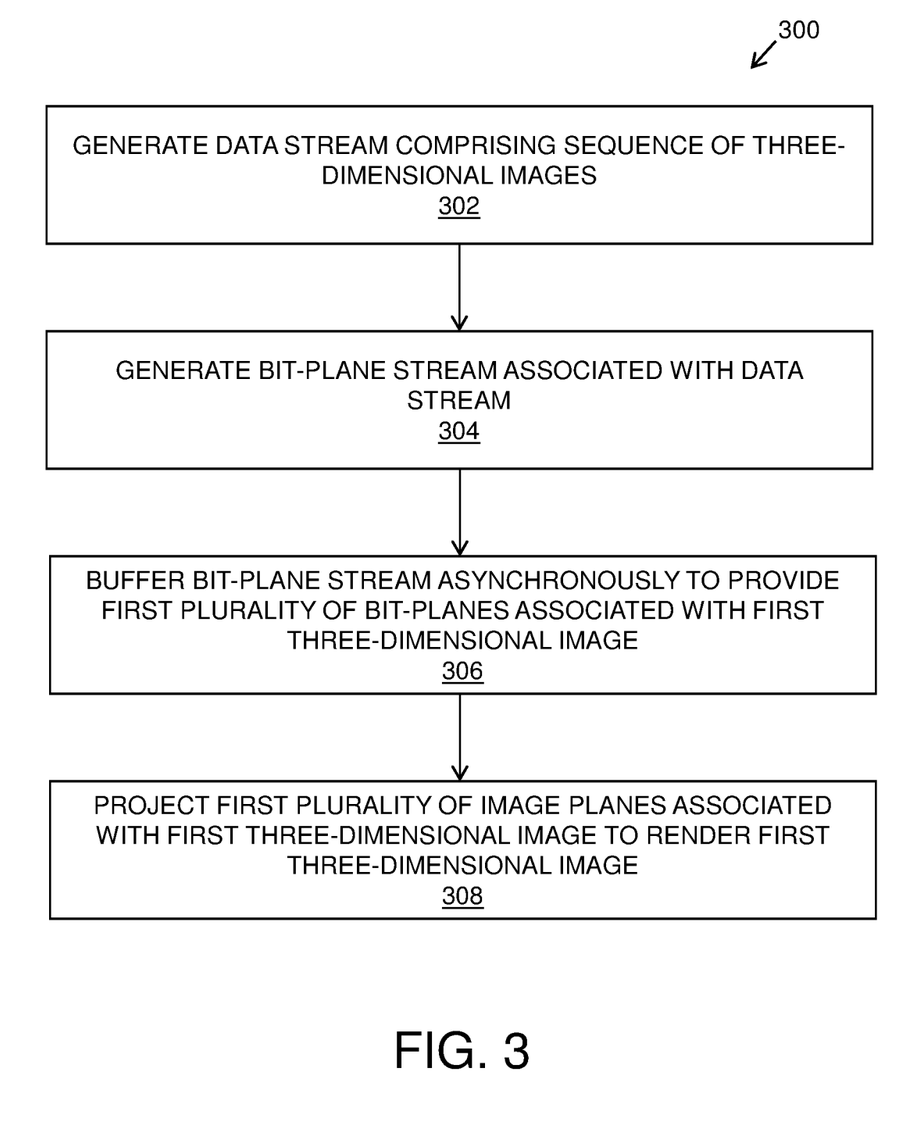
FIG. 3 illustrates steps of a method of displaying a sequence of three-dimensional images, in accordance with an embodiment of the present disclosure

Referring to FIG. 3, illustrated are steps of a method 300 of displaying a sequence of three-dimensional images, in accordance with an embodiment of the present disclosure. At step 302, a data stream comprising a plurality of image planes associated with each image of the sequence of three-dimensional images, is generated. At step 304, a bit-plane stream associated with the data stream is generated, the bit-plane stream comprising a plurality of bit-planes associated with each image of the sequence of three-dimensional images. At step 306, the bit-plane stream is asynchronously buffered to provide a first plurality of bit-planes associated with a first three-dimensional image. At step 308, a first plurality of image planes associated with the first three-dimensional image is projected to display the first three-dimensional image, based upon the first plurality of bit-planes, the first plurality of image planes being projected until a second plurality of bit-planes associated with a second three-dimensional image is provided.

The steps 302 to 308 are only illustrative and other alternatives can also be provided where one or more steps are added, one or more steps are removed, or one or more steps are provided in a different sequence without departing from the scope of the claims herein.

Figure 4:
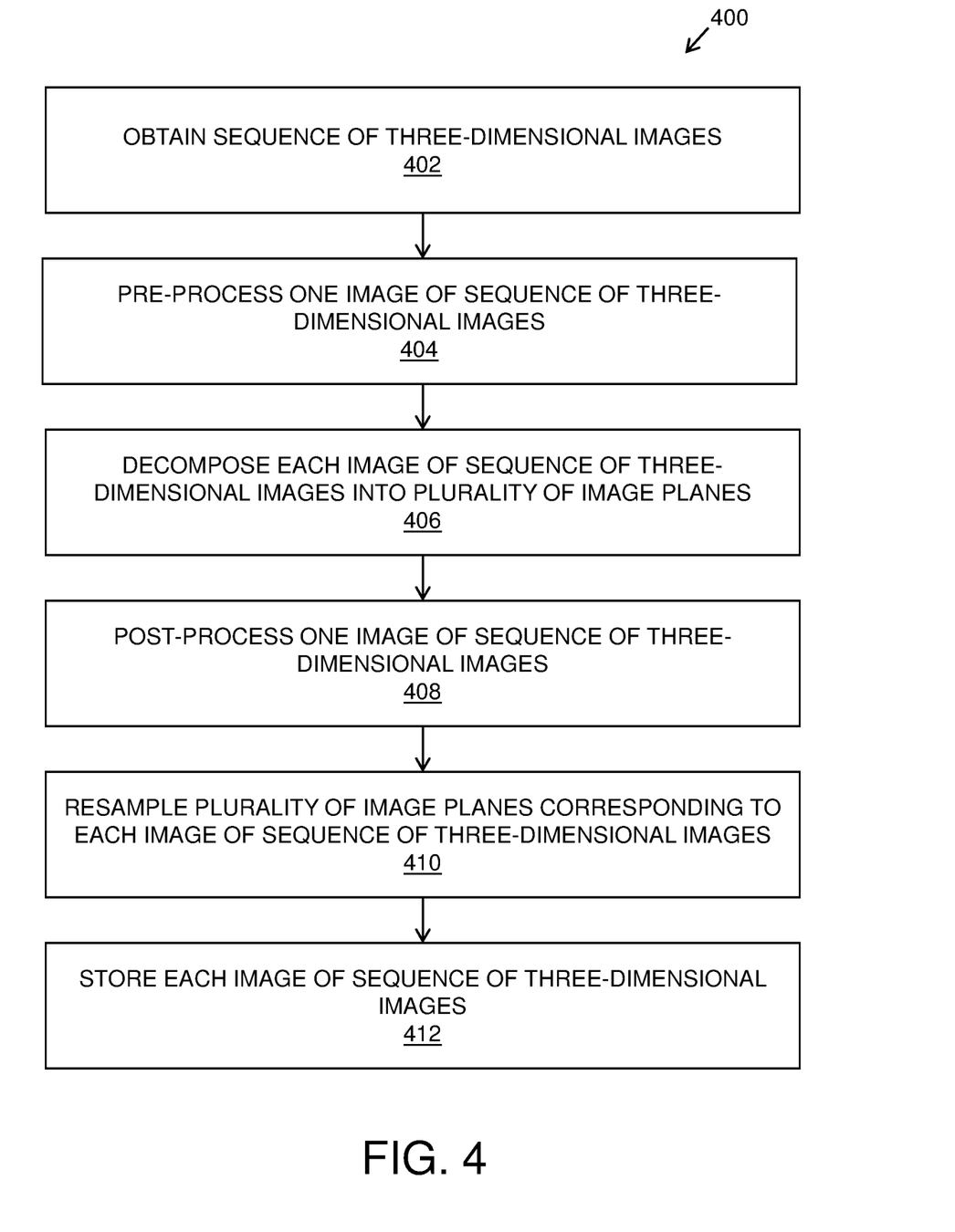
FIG. 4 illustrates steps of a method of generating a data stream, in accordance with an embodiment of the present disclosure.

Referring to FIG. 4, illustrated are steps of a method 400 of generating a data stream. At step 402, a sequence of three-dimensional images is obtained. At step 404, at least one image of the sequence of three-dimensional images is pre-processed. At step 406, each image of the sequence of three-dimensional images is decomposed into a plurality of image planes corresponding thereto. At step 408, the at least one image of the sequence of three-dimensional images is post-processed. At step 410, the plurality of image planes corresponding to each image of the sequence of three-dimensional images are resampled. At step 412, each image of the sequence of three-dimensional images is stored as a mosaic of the resampled plurality of image planes.

The steps 402 to 412 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of displaying a sequence of three-dimensional images, the method comprising:
   (i) generating a data stream comprising a plurality of image planes associated with each image of the sequence of three-dimensional images;
   (ii) generating a bit-plane stream associated with the data stream, the bit-plane stream comprising a plurality of bit-planes associated with each image of the sequence of three-dimensional images;
   (iii) buffering the bit-plane stream asynchronously to provide a first plurality of bit-planes associated with a first three-dimensional image; and
   (iv) projecting a first plurality of image planes associated with the first three-dimensional image to display the first three-dimensional image, based upon the first plurality of bit-planes, the first plurality of image planes being projected until a second plurality of bit-planes associated with a second three-dimensional image is provided, wherein generating the data stream at (i) comprises:
   (a) obtaining the sequence of three-dimensional images;
   (b) pre-processing at least one image of the sequence of three-dimensional images;
   (c) decomposing each image of the sequence of three-dimensional images into a plurality of image planes corresponding thereto;
   (d) post-processing the at least one image of the sequence of three-dimensional images;
   (e) resampling the plurality of image planes corresponding to each image of the sequence of three-dimensional images; and
   (f) storing each image of the sequence of three-dimensional images as a mosaic of its resampled plurality of image planes.

2. The method of claim 1, wherein the sequence of three-dimensional images is displayed in real or near-real time.

3. The method of claim 1, wherein the sequence of three-dimensional images is displayed at a near-eye display apparatus.

4. The method of claim 1, wherein pre-processing the at least one image of the sequence of three-dimensional images at (b) comprises at least one of:
   linearly transforming the at least one image;
   cropping the at least one image.

5. The method of claim 1, wherein post-processing the at least one image of the sequence of three-dimensional images at (d) comprises at least one of:
   adding graphical representation and/or pointer information to a plurality of image planes corresponding to the at least one image;
   implementing inter-plane antialiasing for the at least one image.

6. The method of claim 1, wherein the decomposing at (c) for a given three-dimensional image comprises:
   selecting a three-dimensional volume of interest within the given three-dimensional image;
   decomposing the three-dimensional volume of interest into a plurality of clipped image planes corresponding to the given three-dimensional image; and
   obtaining depth information associated with the plurality of clipped image planes by mapping the plurality of clipped image planes though the given three-dimensional image at discrete positions.

7. The method of claim 1, wherein buffering the bit-plane stream asynchronously at (iii) comprises:
receiving the bit-plane stream, at a first data exchange rate;
storing the received bit-plane stream, at a dedicated memory buffer
extracting upon request the stored bit-plane stream from the dedicated buffer;
transmitting the extracted bit-plane stream at a third data exchange rate,
wherein the sum of the first data exchange rate and the third data exchange rate doesn't exceed the second data exchange rate.

8. The method of claim 1, further comprising:
(v) obtaining feedback from a user, wherein the feedback pertains to the displayed sequence of three-dimensional images; and
(vi) implementing an action in real or near-real time, based upon the obtained feedback.

9. The method according to claim 1, further comprising buffering the generated data stream (i) asynchronously prior generating a bit plane stream (ii).

10. A volumetric display system for displaying a sequence of three-dimensional images, the volumetric display system comprising:
a multi-plane volumetric display comprising a plurality of optical diffusers, wherein at least plane of the volumetric display is implemented by way of an electrically controllable optical diffuser;
a volumetric display driver coupled to the multi-plane volumetric display, the volumetric display driver being configured to control operation of the multi-plane volumetric display;
a graphics processing unit configured to generate a data stream comprising a plurality of image planes associated with each image of the sequence of three-dimensional images; and
a projector communicably coupled to the graphics processing unit and the volumetric display driver, the projector comprising a light source, a spatial light modulator, a projection arrangement, a logic block, a memory unit and a driver module, the logic block being communicably coupled to the memory unit, and the driver module being coupled to the light source, the spatial light modulator, the projection arrangement, the logic block and the memory unit, wherein:
the logic block is configured to generate a bit-plane stream associated with the data stream, the bit-plane stream comprising a plurality of bit-planes associated with each image of the sequence of three-dimensional images;
the memory unit is configured to buffer the bit-plane stream asynchronously to provide a first plurality of bit-planes associated with a first three-dimensional image to the driver module; and
the driver module is configured to control the light source, the spatial light modulator, and the projection arrangement to project a first plurality of image planes associated with the first three-dimensional image for displaying the first three-dimensional image at the multi-plane volumetric display, based upon the first plurality of bit-planes, the first plurality of image planes being projected until a second plurality of bit-planes associated with a second three-dimensional image is provided to the driver module.

11. The volumetric display system of claim 10, wherein the volumetric display driver is configured to control the plurality of optical diffusers for displaying the sequence of three-dimensional images at the multi-plane volumetric display in real or near-real time.

12. The volumetric display system of claim 10, wherein the multi-plane volumetric display is implemented at a near-eye display apparatus.

13. The volumetric display system of claim 10, wherein the graphics processing unit is configured to:
obtain the sequence of three-dimensional images;
pre-process at least one image of the sequence of three-dimensional images;
decompose each image of the sequence of three-dimensional images into a plurality of image planes corresponding thereto;
post-process the at least one image of the sequence of three-dimensional images;
resample the plurality of image planes corresponding to each image of the sequence of three-dimensional images; and
store each image of the sequence of three-dimensional images as a mosaic of its resampled plurality of image planes.

14. The volumetric display system of claim 13, wherein whilst pre-processing the at least one image, the graphics processing unit is configured to:
linearly transform the at least one image; and/or
crop the at least one image.

15. The volumetric display system of claim 13, wherein whilst post-processing the at least one image, the graphics processing unit is configured to:
add graphical representation and/or pointer information to a plurality of image planes corresponding to the at least one image; and/or
implement inter-plane antialiasing for the at least one image.

16. The volumetric display system of claim 13, wherein whilst decomposing each image of the sequence of three-dimensional images, the graphics processing unit is configured to:
select a three-dimensional volume of interest within the given three-dimensional image;
decompose the three-dimensional volume of interest into a plurality of clipped image planes corresponding to the given three-dimensional image; and
obtain depth information associated with the plurality of clipped image planes by translating the plurality of clipped image planes though the given three-dimensional image at discrete positions.

17. The volumetric display system of claim 10, wherein the memory unit further comprises at least one input data buffer, at least one output data buffer, an external memory module and a memory controller module, wherein whilst buffering the bit-plane stream asynchronously, the memory controller module is configured to:
monitor a first fill state of the at least one input data buffer, which the at least one input data buffer is configured to receive the bit-plane stream from the logic block at a first data exchange rate;
monitor a second fill state of the at least one output data buffer, which the at least one output data buffer is configured to transmit the bit-plane stream to the driver module, at a third data exchange rate;
use the first fill state to control the external memory module to store the received bit-plane stream;

use the second fill state to control the external memory module to extract the stored bit-plane stream and transmit the extracted bit-plane stream to the at least one output data buffer;

wherein the sum of the first data exchange rate and the third data exchange rate is less than a second data exchange rate.

18. The volumetric display system of any of claim 10, wherein the driver module is configured to:
   obtain feedback from a user, wherein the feedback pertains to the displayed sequence of three-dimensional images; and
   implement an action in real or near-real time, based upon the obtained feedback.

19. The volumetric display system of claim 10, wherein a refresh rate of the multi-plane volumetric display lies within 20 Hz to 75 Hz.

* * * * *